Figure 1:
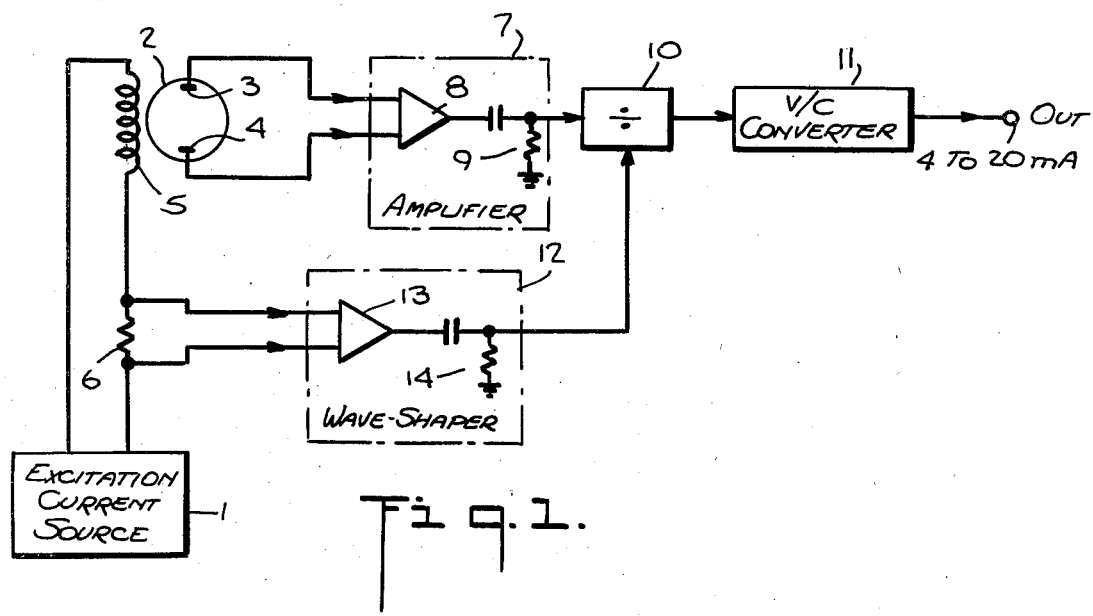

United States Patent [19]

Kobayashi et al.

[11] 4,181,019

[45] Jan. 1, 1980

[54] ELECTROMAGNETIC FLOWMETER WITH NOISE COMPENSATION

[75] Inventors: Tamotsu Kobayashi, Yokohama; Kazuie Suzuki, Tokyo; Takashi Torimaru, Musashino, all of Japan

[73] Assignee: Hokushin Electric Works, Ltd., Tokyo, Japan

[21] Appl. No.: 941,739

[22] Filed: Sep. 12, 1978

[30] Foreign Application Priority Data

Sep. 22, 1977 [JP] Japan .......................... 52/127630[U]

[51] Int. Cl.² ............................................. G01F 1/60
[52] U.S. Cl. ................................................ 73/194 EM
[58] Field of Search ................. 73/194 EM, 194 E; 333/172

[56] References Cited

U.S. PATENT DOCUMENTS

| | | | |
|---|---|---|---|
| 3,902,366 | 9/1975 | Gruner | 73/194 EM |
| 4,059,014 | 11/1977 | Torimara | 73/194 EM |

Primary Examiner—Jerry W. Myracle
Attorney, Agent, or Firm—Michael Ebert

[57] ABSTRACT

An electromagnetic flowmeter in which a low-frequency rectangular wave is supplied to the electromagnet coil of the flowmeter to produce an excitation current establishing a magnetic field which is intercepted by the fluid passing through the flow tube to induce a signal voltage in the electrodes disposed in the tube. This signal voltage is proportional to flow rate and is accompanied by an objectionable D-C noise component. To eliminate this noise component, the signal voltage is passed through a first high-pass filter, and to compensate for errors introduced by this filter, the signal voltage derived from the first filter is divided by a comparison voltage derived from the excitation current, but only after this comparison voltage passes through a second high-pass filter having essentially the same characteristics as the first filter.

7 Claims, 3 Drawing Figures

ELECTROMAGNETIC FLOWMETER WITH NOISE COMPENSATION

BACKGROUND OF INVENTION

This invention relates generally to electromagnetic flowmeters, and more particularly to a flowmeter in which a low-frequency rectangular wave is used to excite the electromagnet.

In recent years, use has been made of electromagnetic flowmeters provided with a low-frequency rectangular wave excitation system to produce in the coil of the electromagnet an excitation current whose frequency is low compared to the frequency of the standard A-C power line; for example, a frequency of 3 Hz to 30 Hz as compared to a conventional 50 or 60 Hz power line frequency.

In a flowmeter in which the fluid to be metered flows through a flow tube to intercept the magnetic field established therein and to thereby induce a signal voltage in a pair of electrodes disposed at diametrically-opposed positions in the tube, the signal voltage which is proportional to flow rate is accompanied by a D-C noise voltage component resulting from an electrochemical action between the electrodes as well as by a 90° noise voltage component (J-component).

The D-C noise voltage component has an amplitude amounting to several hundred $\mu V$ to several mV, and it may in some instances become equal in amplitude or even higher than the amplitude of the signal voltage which is usually about 1mV/(m/sec) in proportion to flow rate. Moreover, the D-C noise component does not remain constant, but varies within a period ranging from several seconds to several minutes.

it has heretofore been the general practice in conventional electromagnetic flowmeters whose excitation current frequency is equal to that of the commercial power line to eliminate D-C noise voltage by passing the voltage developed between the flowmeter electrodes through a high-pass filter. When, however, this filtering scheme is applied to a flowmeter whose excitation current is a low-frequency rectangular wave having a frequency that is lower than the power line frequency, several problems are encountered.

Thus when applying a rectangular wave having a constant voltage to the excitation coil of the flowmeter, the rise and fall characteristics of the excitation current change as a result of temperature variations in the time constant of the excitation coil. This leads to a change in the rise and fall characteristics of the magnetic flux produced by the electromagnet of the flowmeter, causing a change in the time constant of the signal voltage. As a result, the signal voltage is superimposed on a low-frequency rectangular wave to introduce an error due to the passage of the signal through the high-pass filter.

Moreover, temperature variations in the time constant of the high-pass filter also introduce an error in the signal voltage.

We shall now explain the extent to which such errors develop.

Assuming that the high-pass filter used is a CR one-stage filter and that the following signal voltage $vi$ which varies with a time constant $\tau$ is applied to the high-pass filter:

$$vi = Vi(1 - 3^{-t/\tau}) \quad (1)$$

(where Vi is a constant value). Since the time constant of the high-pass filter is CR, the output voltage $vo$ from the high-pass filter is as follows:

$$vo = \frac{vi}{\frac{\tau}{CR} - 1}(e^{-t/\tau} - e^{-t/CR}) \quad (2)$$

Accordingly, the output $vo$ depends upon the time constant $\tau$ of the signal voltage $vi$. The time constant $\tau$ depends upon the time constant of the excitation coil in the rectangular-wave excitation type electromagnetic flowmeter.

On the other hand, the resistance of the magnet wire forming the excitation coil varies about 4% for a temperature change of 10° C. Therefore, in the case of a temperature change of 50° C., the time constant of the excitation coil varies about 20%, and the time constant of the signal voltage also varies about 20%.

Then, substituting $\tau=10$ ms, CR=0.5 s and t (the time from the rise of the signal voltage to the instant of its sampling) =80 ms as practical values in equation (2), the output $vo$ varies approximately 0.4% with a change of 20% of the time constant $\tau$ to produce an error.

This error can be avoided by selecting the time constant CR of the high-pass filter to be large relative to the excitation frequency to permit the full passage of the signal voltage superimposed on the low-frequency rectangular wave. However, the large time constant CR of the high-pass filter is susceptible to the influence of the d-c noise voltage and is adversely affected thereby. Thus, the selection of the time constant of the high-pass filter is subject to contradictory restrictions.

SUMMARY OF INVENTION

In view of the foregoing, the main object of the invention is to provide an electromagnetic flowmeter whose electromagnet is excited by a low-frequency rectangular wave and wherein the signal voltage generated by the flowmeter is accompanied by an objectionable D-C noise voltage component which is eliminated by passing the signal voltage through a high-pass filter, means being included to compensate for errors introduced by this filter.

More particularly, it is an object of this invention to compensate for errors introduced by the high-pass filter by dividing the signal voltage derived from this filter with a comparison voltage derived from the excitation current, but only after the comparison voltage has passed through a second high-pass filter whose characteristics are essentially the same as those of the first filter.

OUTLINE OF DRAWINGS

Figure 2:
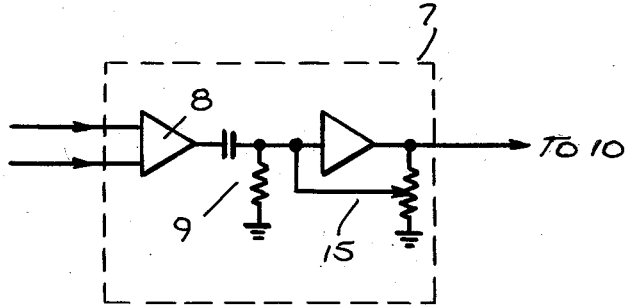
Figure 3:
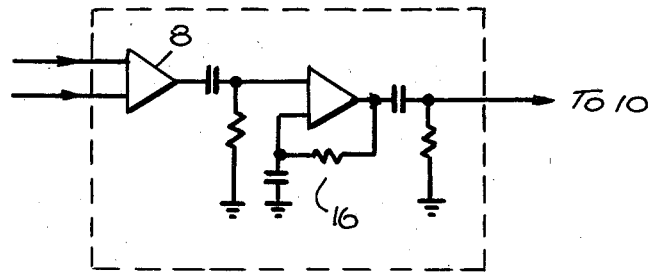

For a better understanding of the invention as well as other objects and further features thereof, reference is made to the following detailed description to be read in conjunction with the accompanying drawings, wherein:

FIG. 1 schematically illustrates in block diagram form one preferred embodiment of an electromagnetic flowmeter system in accordance with the invention;

FIG. 2 shows one modification of the amplifier circuit included in the system; and FIG. 3 illustrates another modification of this amplifier circuit.

DESCRIPTION OF INVENTION

Referring now to FIG. 1, there is shown one preferred embodiment of an electromagnetic flowmeter system in accordance with the invention, the system including a rectangular-wave source 1 which supplies current to the excitation coil 5 of the flowmeter electromagnet. The flowmeter flow tube 2 is provided with diametrically-opposed electrodes 3 and 4, whereby a fluid to be metered is conducted through the tube and intercepts an electromagnetic field established by coil 5 to induce a signal voltage representative of flow rate in electrodes 3 and 4.

Interposed in the excitation circuit of coil 5 is a current-detecting resistor 6. The voltage developed across resistor 6 depends on and varies with the excitation current and is applied to the pre-amplifier 13 of a waveform-shaping circuit 12 having a high-pass filter 14 in the output of the pre-amplifier.

Electrodes 3 and 4 are connected to the input of the pre-amplifier 8 in an amplifier circuit 7, a high-pass filter 9 being connected in the output of this pre-amplifier. High pass filter 9 has substantially the same characteristics as those of filter 14. The filtered output of amplifier circuit 7 is applied to one input of a divider 10 to whose other input is applied the filter output of waveform-shaping circuit 12, the output of divider 10 being fed to an output stage 11.

In operation of this flowmeter system, a low-frequency rectangular wave voltage is supplied by source 1 to excitation coil 5 to cause an excitation current to flow therethrough. The resultant electromagnetic field which is intercepted by the fluid flowing through flow tube 2 induces a signal voltage proportional to flow rate. Also generated are a J-noise voltage component and a D-C noise voltage component, all of which are amplified by pre-amplifier 8 in amplifier 7.

The D-C noise component is eliminated by high pass filter 9, the signal voltage therefrom being applied to one input of divider 10.

At the same time, the voltage developed across excitation current-detecting resistor 6 is amplified by pre-amplifier 13 and then waveform-shaped by high-pass filter 14 in its output. The output from filter 14 acts as a comparison voltage in divider 10 where the signal voltage from amplifier circuit 7 is divided by this comparison voltage to compensate for any measurement error resulting from fluctuations in the level of excitation current. The voltage output of divider 10 is converted in output stage 11 to a corresponding current signal, preferably in the range of 4 to 20 mA to provide a useful flowmeter output.

Thus in the flowmeter system in accordance with the invention, the signal voltage derived from the flowmeter electrodes and the comparison voltage derived from the excitation current pass through high-pass filters 9 and 14, respectively. Inasmuch as the signal voltage is proportional to the excitation current, the time constants of the signal voltage and that of the comparison voltage are substantially equal to each other.

As a consequence, the signal voltage and the comparison voltage are both subject to the influence of the respective high-pass filters. But in divider 10, the signal voltage is divided by the comparison voltage, so that errors for which the filters are responsible cancel each other out, to theoretically produce a zero error. In practice, however, tests indicate that the actual error due to the filters is generally less than 0.1% and is therefore insignificant.

FIG. 2 is one modified form of amplifier circuit 7. In this instance, the output of high-pass filter 9 goes through a variable-gain amplifier 15 to effect span adjustment. In the modification shown in FIG. 3, the high-pass filter, in this instance, following pre-amplifier 8 is constituted by a multi-stage filter 16 which is illustrated as a three-stage filter. The high-pass filter is wave-shaping circuit 12 may likewise be constituted by a multi-stage filter.

Thus in the foregoing arrangement, the D-C noise voltage component which accompanies the signal voltage taken from the flowmeter electrodes is eliminated by a high-pass filter, while the error introduced by this filter is minimized by deriving the comparison voltage through a similar high-pass filter before the signal voltage is divided by the comparison voltage.

As to the J-noise voltage component, this can be minimized in a conventional manner by the use of a low-frequency excitation voltage and by sampling the signal only when the rectangular excitation current is at a stable level.

While there has been shown and described a preferred embodiment of an electromagnetic flowmeter with noise compensation in accordance with the invention, it will be appreciated that many changes and modifications may be made therein without, however, departing from the essential spirit thereof.

We claim:

1. In an electromagnetic flowmeter provided with a flow tube through which the fluid to be metered is conducted to intercept a magnetic field established by an electromagnet having an excitation coil to induce a signal voltage in a pair of electrodes disposed in the tube, which signal voltage is a function of flow rate and is accompanied by an objectionable D-C noise voltage, the combination comprising:

A an excitation circuit to apply a low-frequency rectangular wave to said coil whose frequency is lower than the frequency of a standard A-C power line to produce an excitation current;

B means interposed in the excitation circuit to derive therefrom a comparison voltage which varies in accordance with said excitation current;

C amplifier means to pass the signal voltage accompanied by said noise voltage through a first high-pass filter to eliminate said noise voltage, said first filter introducing an error in said signal voltage;

D wave-shaping means to pass the comparison voltage through a second high-pass filter having essentially the same characteristics as said first filter; and E a divider to divide the output of said amplifier means with that of said wave-shaping means to compensate for said error, thereby yielding an error-free signal voltage.

2. The combination as set forth in claim 1, wherein amplifier means are constituted by a pre-amplifier followed by a capacitor-resistor high-pass filter.

3. The combination as set forth in claim 2, wherein said amplifier means further includes a variable gain amplifier to effect span adjustment.

4. The combination as set forth in claim 1, wherein said wave-shaping means are constituted by a pre-amplifier followed by a capacitor-resistor high-pass filter.

5. The combination as set forth in claim 1, wherein the high-pass filter in the wave-shaping means and in the amplifier means are each constituted by a multi-stage filter.

6. The combination as set forth in claim 1, wherein the output of said divider is converted into a corresponding circuit current.

7. The combination as set forth in claim 6, wherein said current is in the range of 4 to 20 mA.

* * * * *